Sept. 2, 1924.

C. S. SHARP

BAKER'S OVEN

Filed June 1, 1921

INVENTOR
Charles S. Sharp
BY
Everett H. Rook,
ATTORNEYS.

Sept. 2, 1924.
C. S. SHARP
BAKER'S OVEN
Filed June 1, 1921
1,507,257
3 Sheets-Sheet 2
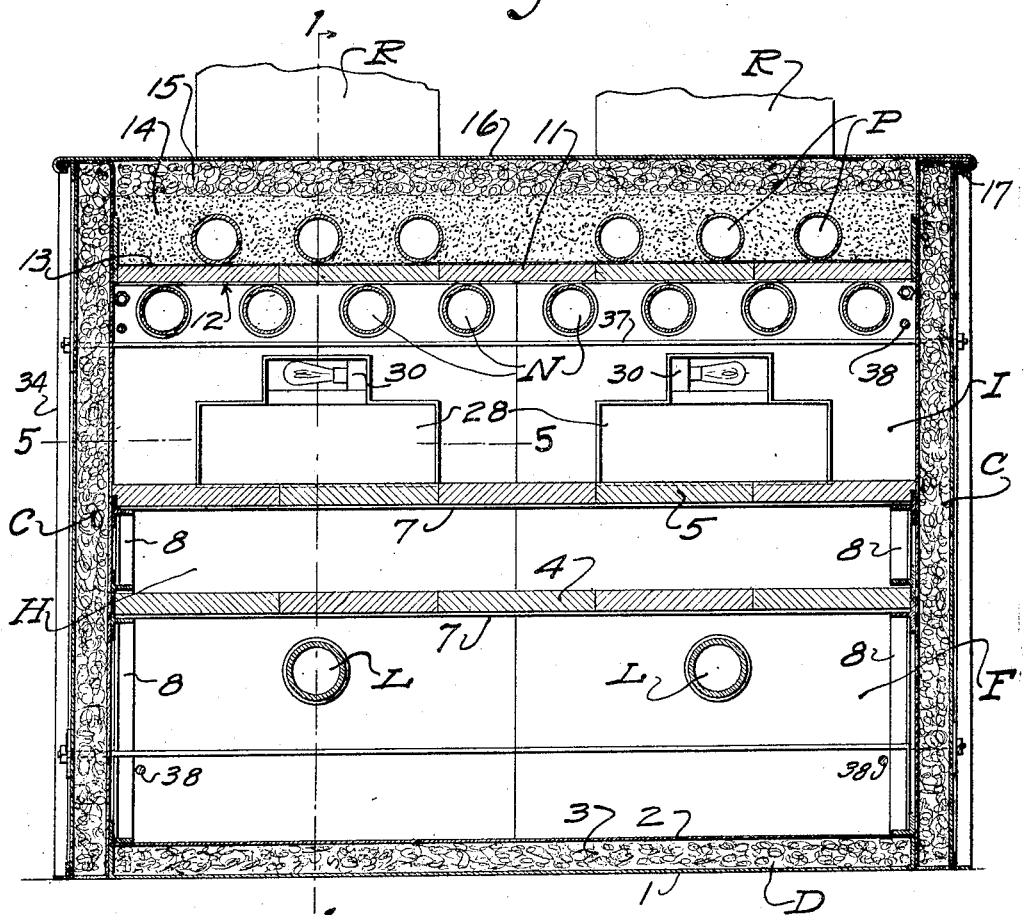
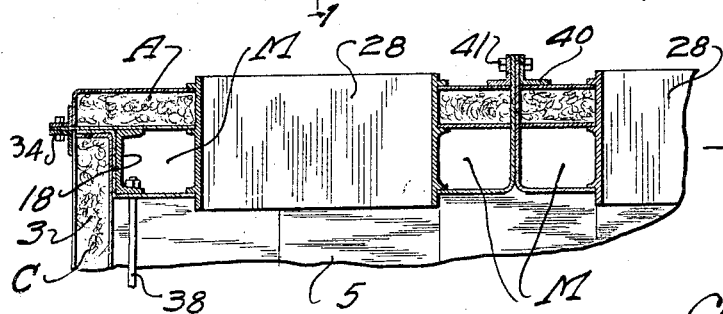
INVENTOR
Charles S. Sharp,
BY
Everett Rook,
ATTORNEYS

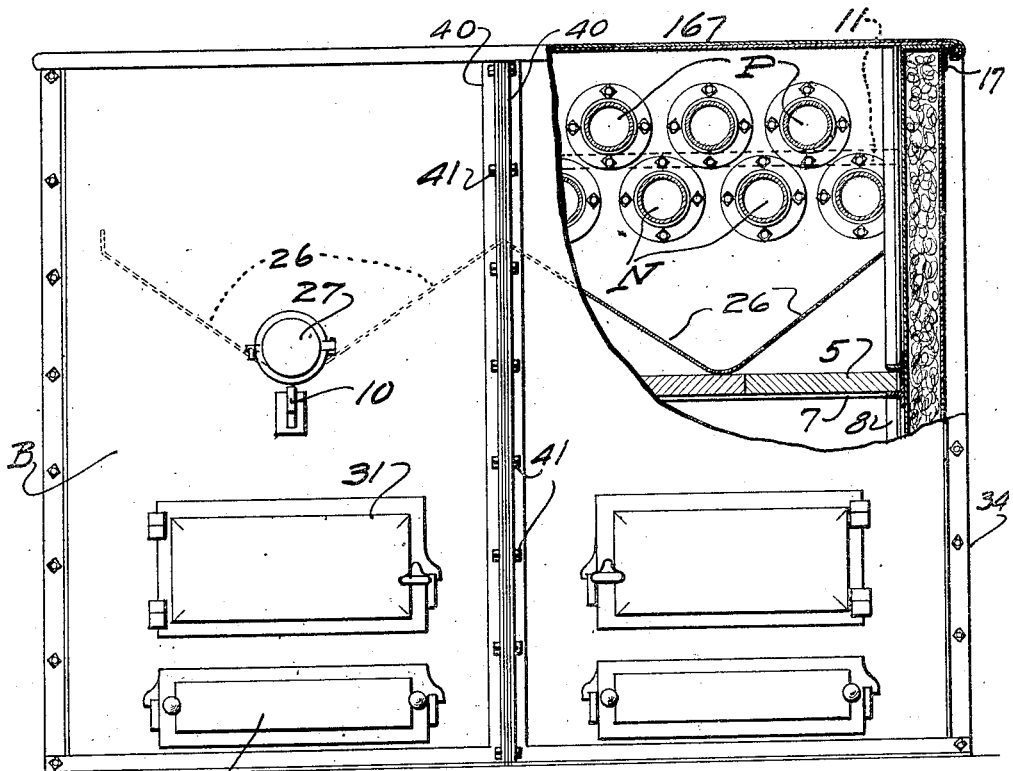
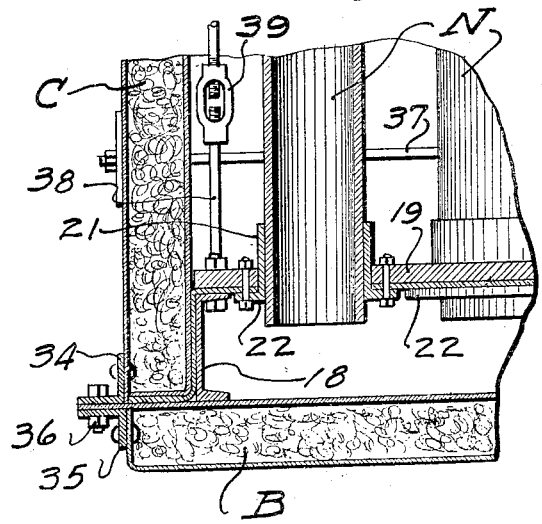
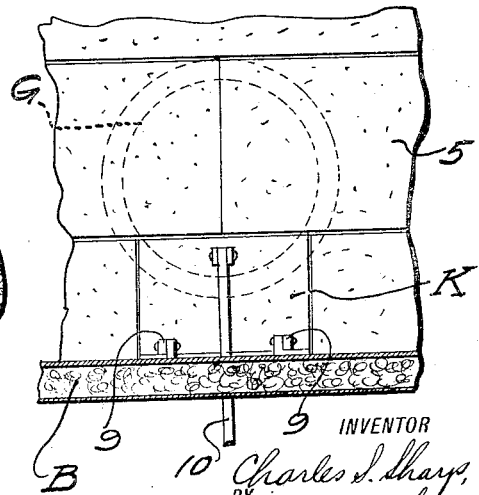

Patented Sept. 2, 1924.

1,507,257

UNITED STATES PATENT OFFICE.

CHARLES S. SHARP, OF BOONTON, NEW JERSEY.

BAKER'S OVEN.

Application filed June 1, 1921. Serial No. 474,179.

*To all whom it may concern:*

Be it known that I, CHARLES S. SHARP, a citizen of the United States, and a resident of Boonton, in the county of Morris and State of New Jersey, have invented new and useful Improvements in Bakers' Ovens, of which the following is a specification.

This invention relates in general to bakers' ovens, and more particularly to bakers' ovens of the portable type, one object of the invention being to provide an improved construction and arrangement of the heat flues or conduits whereby the material being baked is subjected to the heat in a more effective manner than has heretofore been possible in the ordinary known ovens.

Further objects of the invention are to provide a baker's oven in which a maximum heat may be obtained at the top of the material being baked in the baking chamber and in which the heat at the bottom of the baking chamber can be effectively regulated; to provide an oven of this character having heat flues or conduits arranged within the baking chamber at the top or crown thereof whereby direct radiation of the heat from the flues into the baking chamber is permitted, and means whereby the bottom heat of the baking chamber may be regulated for baking under different conditions without affecting the top heat; to thus provide a heat chamber directly beneath the baking chamber and a heat chamber around the furnaces beneath said first-mentioned chamber, means being provided for establishing communication between said heat chambers to permit a free circulation of heat radiated from the furnaces through said heat chamber directly beneath the baking chamber; to provide an improved construction and arrangement of the heat flues from the furnaces whereby the hot gases circulate from front to back of the oven; and to obtain other results and advantages as may be brought out by the following description.

Referring to the accompanying drawings, in which like numerals of reference indicate the same parts throughout the several views, Figure 1 is a vertical longitudinal sectional view through a baker's oven constructed in accordance with my invention, taken on the line 1—1 of Fig. 2;

Figure 2 is a transverse vertical sectional view through the oven taken on the line 2—2 of Fig. 1;

Figure 3 is an elevation, partly in section, of the back of the oven;

Figure 4 is an enlarged fragmentary horizontal sectional view through one corner of the oven showing the details of construction;

Figure 5 is a horizontal sectional view through the front of the oven taken on the line 5—5 of Fig. 2, and Figure 6 is a fragmentary horizontal sectional view taken on the line 6—6 of Fig. 1.

Figure 1:
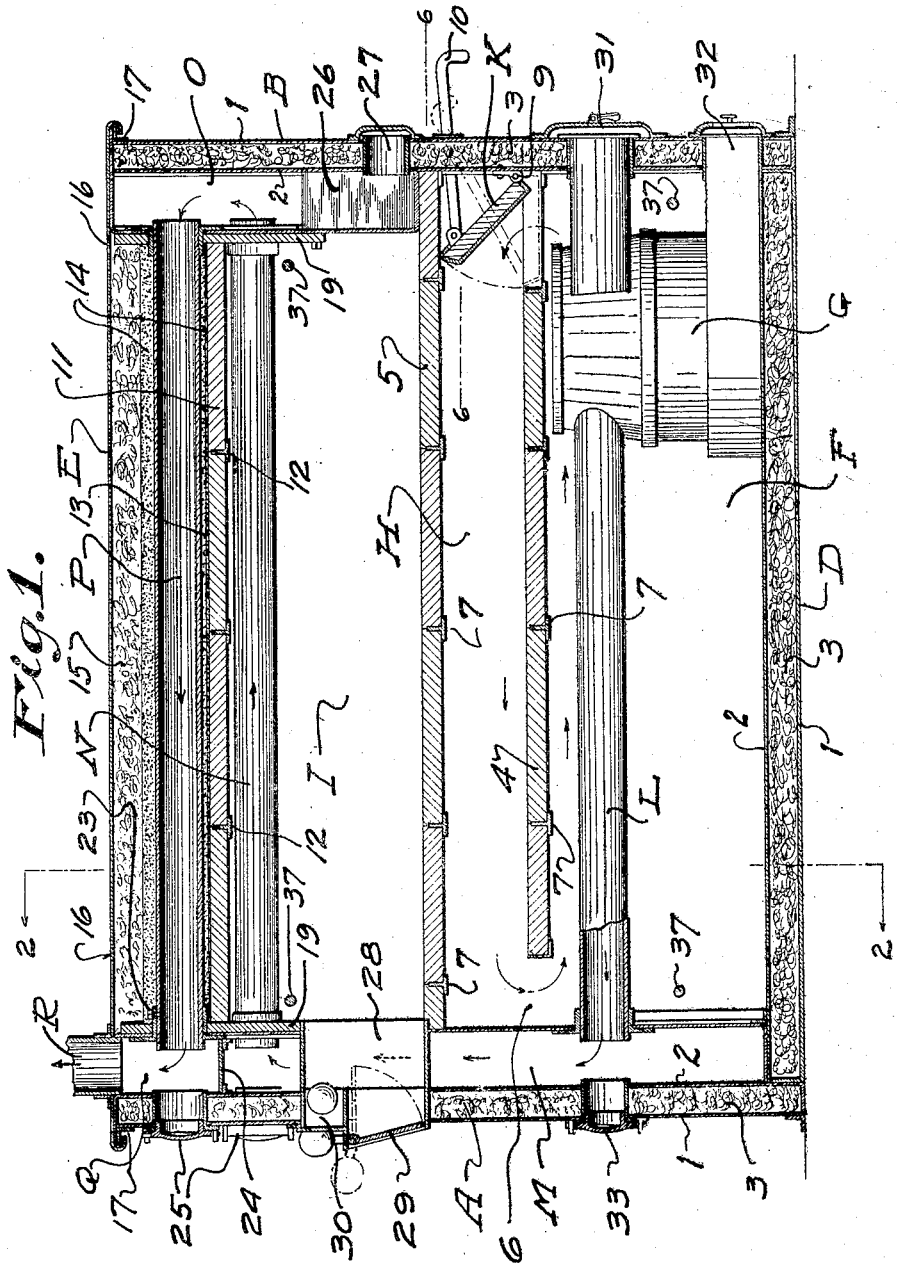

In the embodiment of my invention shown on the drawings, the reference character A designates the front of the oven, B the back, C the sides, D the bottom and E the top. The front, back and sides of the oven are preferably formed of similar sections, as shown in Figure 3, for facilitating the transportation of the oven and enabling extra sections to be added to an oven in order to increase the capacity thereof. The front, back and sides of the oven are also preferably formed of spaced sheets of metal 1 and 2 between which is arranged suitable heat insulating material 3, although it will be understood that other constructions for producing insulated walls for the oven may be utilized.

In general the invention consists in forming a furnace chamber F at the bottom of the oven to receive the cast iron or the like furnaces G, which permit rapid radiation of heat therefrom, said chamber F being always in communication at one end thereof with a heat chamber H arranged above the chamber F and immediately below the baking chamber I, the other end of the chamber H being adapted to communicate with the corresponding end of the chamber F by means of dampers K. Circulation of the heat radiated from the furnaces in the chamber F is thus permitted through the chamber H directly beneath the baking chamber I. The hot gases from the furnaces are adapted to circulate through horizontal flues L connected between the furnaces and vertical flues M at the front of the oven, from which the gases pass through crown flues N in the top of the baking chamber I to vertical flues O at the back of the oven, thence through flues P arranged in the crown of the oven to outlet flues Q at the front of the oven from where the gases pass into the chimneys or stacks R. The furnaces G are shown as arranged at the back of the oven, and the hot gases therefrom thus pass from the back to the front of the oven below the baking chamber I and then upwardly through the baking chamber to the back of the oven, and then again to the front of the oven before reaching the chimneys. With the dampers K closed the heat radiated from the furnaces and the flues L passes into the chamber H and heats the bottom of the baking chamber, the heat from the hot gases from the furnace being radiated directly from the crown flues N into the top of the baking chamber so that a maximum heat is obtained at the top of the baking chamber which can be regulated by varying the draft in the furnace. The bottom heat of the oven is regulated by the dampers K, and when it is desired to increase the bottom heat on the baking chamber I the dampers are opened to permit circulation of the heat radiated from the furnaces through the chambers F and H, as indicated by arrows on Figure 1. This regulation of the bottom heat of the baking chamber is independent of the regulation of the top heat in the chamber radiating from the flues N.

The chamber F is formed by a substantially horizontal wall or partition 4 arranged above the furnaces G and forming the bed shelf which is spaced from the bottom of another partition 5 forming the baking hearth and terminates at one end thereof short of the front A of the oven to form a passage 6 between the chamber F and chamber H. The bed shelf 4 and baking hearth 5 are preferably formed of tiles which are supported on horizontal T-bars 7 which extend transversely of the oven and are supported at their ends by vertical racks 8 arranged at the sides of the oven. One or more of the tiles at the end of the bed shelf 4 over each of the furnaces G is hingedly connected as at 9 to the back of the furnace to form the dampers K, the said tiles being adapted to be swung about their pivots by suitable operating levers 10 which are adapted to be operated from the outside of the back of the oven, as clearly shown in Figures 1 and 3.

The crown of the baking chamber I is formed by a substantially horizontal layer 11 of tiles which are supported on T-bars 12 arranged transversely over the top of the crown flues N, the said flues thus serving as supports for the crown of the oven, as clearly shown in Figures 1 and 2. The tiles 11 are covered by a sheet of tin or the like 13 upon which is placed a layer 14 of sand, the said sand surrounding the upper level of flues P and the tin 13 serving to prevent the sand from falling between the joints of the tile 11 into the baking chamber I. Above the sand 14 is arranged a layer of insulating material 15 similar to the insulation 3 used in the walls of the oven, the top of the oven being closed by a sheet 16 of metal which has its edges rolled over angle bars 17 secured to the tops of the sides, front and back of the oven.

The flues N and P are preferably formed of wrought iron, and are therefore quite heavy. It is thus necessary to reenforce the walls of the flues M, O and Q for supporting the said flues and the tiles, sand and insulation above the flues. For this purpose I may utilize channel bars 18 at the ends of the flues M, O and Q, as shown in Figures 4 and 5, and secure comparatively heavy plates 19 against the interior of the flues 11, which plates are bolted to the flanges of the channel bars 18, as shown in Figure 4. The channel bars 18 extend vertically of the oven, and it will thus be seen that they will effectively support the flues N and P and the tiles and insulation above them.

For connecting the ends of the flues N and P to the vertical flues M, O and Q at the front and back of the furnace I preferably utilize thimbles 21 which project through openings in the walls of the vertical flues and the plates 19 and have their flanges 22 bolted to the plates 19. The flues N and P are secured to the thimbles 21 at one end of the oven, preferably the front thereof, by means of set screws 23 passing through the thimbles and the flues, as shown in Figure 1, the opposite ends of the flues being loosely mounted in the thimbles so as to allow expansion of the flues without injury to the walls of the oven. All of the lower flues N communicate with each other at the front of the oven and are shut off from communication with the upper flues P at the front of the oven by means of a horizontal wall 24 which separates the vertical flue M from the flue Q. The ends of the flues N at the back of the furnace all communicate with each other and the vertical flue O which is also in communication with the corresponding ends of all of the upper flues P, the opposite ends of said flues P at the front of the oven all communicating with the flues Q connected with the chimneys R. At the front of the oven a plurality of clean-out openings 25 are provided for removing soot from the flues N and P, and at the back of the oven the vertical flue O is provided at its bottom with downwardly converging walls 26 at the junction of which are arranged clean-out openings 27, the said openings 27 thus serving for the vertical flues O.

At the front of the oven are provided openings 28 for placing the bread or the like to be baked in the baking chamber I, the said openings being closed by usual swinging doors 29. Above the openings 28 are provided light openings 30 to receive electric lamps for illuminating the baking chamber I.

The furnaces G may be of the usual construction having the fuel doors 31 projecting through the back of the oven, and the usual ash pits 32. The flue L may be secured to the vertical flue M in the front wall of the oven in a manner similar to that in which the flues N and P are mounted, and a cleanout opening 33 may also be provided for cleaning the said flue.

As above described the oven is preferably made in sections, and one manner of connecting the sections is shown in Figures 4 and 5 which are horizontal sectional views through corners of the oven. The front and back walls A and B of the oven may overlap the ends of the side walls C. Angle bars 34 are secured to the ends of said walls C and similar angle bars 35 are secured to the ends of the front and back walls of the oven, the said angle bars being arranged vertically with one of the flanges of the adjacent bars arranged parallel, and connected by bolts 36. With such a construction it is necessary to provide tie rods for relieving the sides, back and front of the oven from strain, and I therefore provide a plurality of transverse tie rods 37 which extend through the side walls C of the oven and are adjusted by nuts on the ends thereof. A plurality of longitudinal tie rods 38 are also provided, the ends of said tie rods being secured in the corresponding channel bars 18, as shown in Figure 4, the said tie rods being adjusted by means of turn buckles 39. The sides, back and front of the oven may also each be formed of a plurality of sections, and when such is the case, each of the sections is provided with independent flues M, O and Q which cooperate with their respective flues N and P. These sections may be connected together in a manner similar to that of connecting the sides, back and front of the oven above described, angle bars 40 being provided at the edges of the sections and adapted to be connected by bolts 41, as shown in Figures 3 and 5.

While I have shown and described one possible embodiment of my invention, and certain details of construction, it will be understood that this is for the purpose of illustrating the principles of the invention only and that many modifications and changes can be made in the detail construction of ovens without departing from the spirit or scope of the invention. Therefore, I do not desire to be understood as limiting myself except as required by the following claims when construed in the light of the prior art.

Having thus described the invention, what I claim is:

1. A baker's oven including a casing having heat insulated walls, a rapid heat radiating furnace within said casing at the bottom thereof, flues for conducting gases of combustion therefrom, a baking chamber above said furnace, a wall between said furnace and the bottom of said baking chamber, said wall having openings therethrough at the ends thereof, and a closure for one of said openings adapted to open and close the same to control circulation of hot air radiated from said furnace between said wall and the bottom of said baking chamber.

2. A baker's oven comprising a casing having a baking chamber and a heat chamber separated by a partition of high heat conductivity, said partition forming the bottom of said baking chamber and the top of said heat chamber, a heat radiating furnace arranged in said heat chamber adjacent one end thereof so that the heat radiated from said furnace is confined in said heat chamber to heat the bottom of said baking chamber, a second partition disposed between said furnace and said first-mentioned partition in spaced relation to the latter and having openings at its ends, means for opening and closing one of said openings to control circulation of said radiant heat between said first-mentioned and said second-mentioned partitions, and flues passing through said baking chamber adjacent the top thereof to conduct combustion gases from said furnace and heat the top of said baking chamber.

CHAS. S. SHARP.